United States Patent [19]
Stevenson

[11] Patent Number: 5,088,285
[45] Date of Patent: Feb. 18, 1992

[54] INTERNAL COMBUSTION ENGINE

[75] Inventor: Gregory S. Stevenson, Pasadena, Calif.

[73] Assignee: Wagner & Middlebrook, Glendale, Calif. ; a part interest

[21] Appl. No.: 361,450

[22] Filed: Jun. 5, 1989

[51] Int. Cl.⁵ ............................................. F02B 37/00
[52] U.S. Cl. ...................... 60/605.1; 60/272; 123/65 EM; 123/65 BA; 123/65 R
[58] Field of Search .............................. 60/605.1, 272; 123/65 BA, 65 R, 65 EM

[56] References Cited
U.S. PATENT DOCUMENTS
4,432,205 2/1984 Inoue .................................. 60/605.1

FOREIGN PATENT DOCUMENTS
975375 11/1961 Fed. Rep. of Germany ..... 60/605.1

*Primary Examiner*—Douglas Hart
*Attorney, Agent, or Firm*—Wagner & Middlebrook

[57] ABSTRACT

An improved internal combustion engine, particularly of the compression ignition, two cycle, aircraft type employing sleeve valves and a modular cylinder and removable cylinder head and retainer. The engine is turbocharged with the turbocharger separated into the compressor on one side of a V shaped cylinder array and the drive turbine on the opposite side. The exhaust is discharged through the center of the power output shaft making this engine particularly suited for pusher aircraft applications.

18 Claims, 5 Drawing Sheets

INTERNAL COMBUSTION ENGINE

FIELD OF THE INVENTION

This invention relates to the field of internal combustion engines and more particularly to compression ignition aircraft engines.

BACKGROUND OF THE INVENTION

The advantages of the diesel or compression ignition engine for heavy duty industrial and certain automotive applications is well recognized. The application of compression ignition engines to aircraft applications has been considered as impractical throughout the years, particularly, because of the normal high weight to horsepower output ratio of such engines. It is believed that no significant number of compression ignition engines are in aircraft operation today. Likewise, there is a failure to recognize that compression ignition engines for aircraft operation offer a number of important advantages over the conventional spark plug ignited gasoline engine for such applications. These advantages include:

1. Significantly reduced risk of fire due to the absence of electrical ignition and the employment of a high flash point fuel. 2. Greater reliability due to the elimination of the principal sources of conventional aircraft engine failure, i.e. the magneto and spark plugs and associated wiring and contacts.
3. Greater fuel economy and, therefore, increased flight range.
4. Elimination in normally aspirated aircraft engines of carburetor icing and unwanted power variations with altitude, temperature and humidity.
5. More uniform fuel distribution between cylinders due to metered fuel injection.
6. Lower exhaust temperature resulting in greater efficiency and, in military operations, lower infra red signature of the engine exhaust.
7. Elimination of radio interference due to the diesel's non-electric ignition.

None of these advantages of diesel engines for aircraft applications, heretofore could be achieved, however, without paying the unacceptable weight penalty.

I have explored the early attempts to achieve improved aircraft engines, whether of spark or compression ignition and have recognized that early attempts may have employed good design but suffered from the limitations of available materials. An example is the use of sleeve valves. Creative work was done by Sir Harry Ricardo and recounted in his series of books "The High Speed Internal Combustion Engine," particularly Vol. 4, Copyright 1954 and his work and the work of others on sleeve valve engines was described in Chapter 6, entitled "The Sleeve Valve" of the volume "High Speed Valve Mechanisms" by Malvey, copyrighted in the 1960's.

I am aware that turbocharger designs for reciprocating aircraft engines often add greatly to the bulk, cost and complexity of the engine. Likewise, I have noted that the exhaust manifolding and system also adds to the bulk or volume of the engine installation and often adds both back pressure to the engine, reducing its thermal efficiency, and drag to the aircraft profile.

The cylinder design of most aircraft engines usually requires multiple studs with precise torquing and safety wiring of nuts to assure proper installation and operation. Unnecessary weight seems to be involved.

BRIEF DESCRIPTION OF THE INVENTION

Faced with the foregoing state of the art, I have proceed to design a new reciprocating engine capable of compression ignition turbocharged operation while achieving an acceptable weight to horsepower ratio in a simple design.

I have also achieved simplification of the manifolding system in the interest of greater engine efficiency and in the process have reduced the added drag of the exhaust system to virtually zero and, in fact, achieve added thrust from the exhaust of the engine.

These advantages have been obtained in one embodiment of this invention which comprises a two cylinder, two cycle, compression ignited, uniflow, sleeve valve, turbocharged diesel cycle engine. It employs a modular design in which the two cylinders are arranged in a V configuration with the crankcase at the apex of the V and the power output shaft located between the legs of the V. The turbocharger is split with the drive turbine and its housing coaxial with the output shaft on one side of the cylinders and the compression turbine on the opposite side of the cylinders.

The output shaft is hollow and the engine exhaust exits through the output shaft. When the engine is used in pusher aircraft, the exhaust exit of the engine does not add any drag creating surface to the aircraft profile. The exhaust exits in the center of the propeller plane in the direction of desired thrust for dispersion in the propeller wash. Exhaust gases do not flow near lift or control surfaces.

Each cylinder is modular including a cylinder liner which is flanged at its inner end to be secured at one end in the cylinder. A separable cylinder head including the combustion chamber and preheater, if used, is held in place by a single threaded cylinder head retainer which engages the cylinder liner threads.

BRIEF DESCRIPTION OF THE DRAWING

This invention may be more clearly understood from the following detailed description and by reference to the drawing, in which.

DETAILED DESCRIPTION OF THE INVENTION

The principles of this invention can be illustrated in an aircraft engine of small size and horsepower of the type preferred for unmanned vehicle propulsion. Illustrated in FIGS. 1-4 is a two cylinder two cycle turbocharged engine, generally designated 10, shown with an engine mount 12 and including cylinders 14 and 16 which may be integral with crankcase 18. The cylinders 14 and 16 are finned for cooling and each have a removable cylinder head 20 and 22 respectively which mount injectors 24 and 26. The cylinder heads 20 and 22 are each secured to their respective cylinder 14 and 16 by cylinder head retainers 28 and 30 which are threaded into their mating cylinder. The cylinder heads 20 and 22 each close a combustion chamber such as may be seen in FIG. 2 in the sectional portion.

The cylinder 14 with its cylinder head retainer 28 defines a 360 degree exhaust port 32 and manifold 34. Cylinder 16 with its cylinder head retainer 30 defines a similar exhaust port 36 and manifold 38, both unshown in FIG. 2 but contained in the annular section 42 corresponding to the annular section 40 of cylinder 14. The manifold sections 40 and 42 each join the legs of a Y shaped exhaust pipe 44 which terminates in the exhaust housing 46 of turbocharger 48 having two separate sections the compressor section 48A and the drive section 48B, both best seen in FIG. 3. The exhaust driven turbine 50 of turbocharger 48 is mounted within turbocharger exhaust housing 46 on shaft 52 which is journaled on bearings 54 in crankcase 18.

Figure 3:
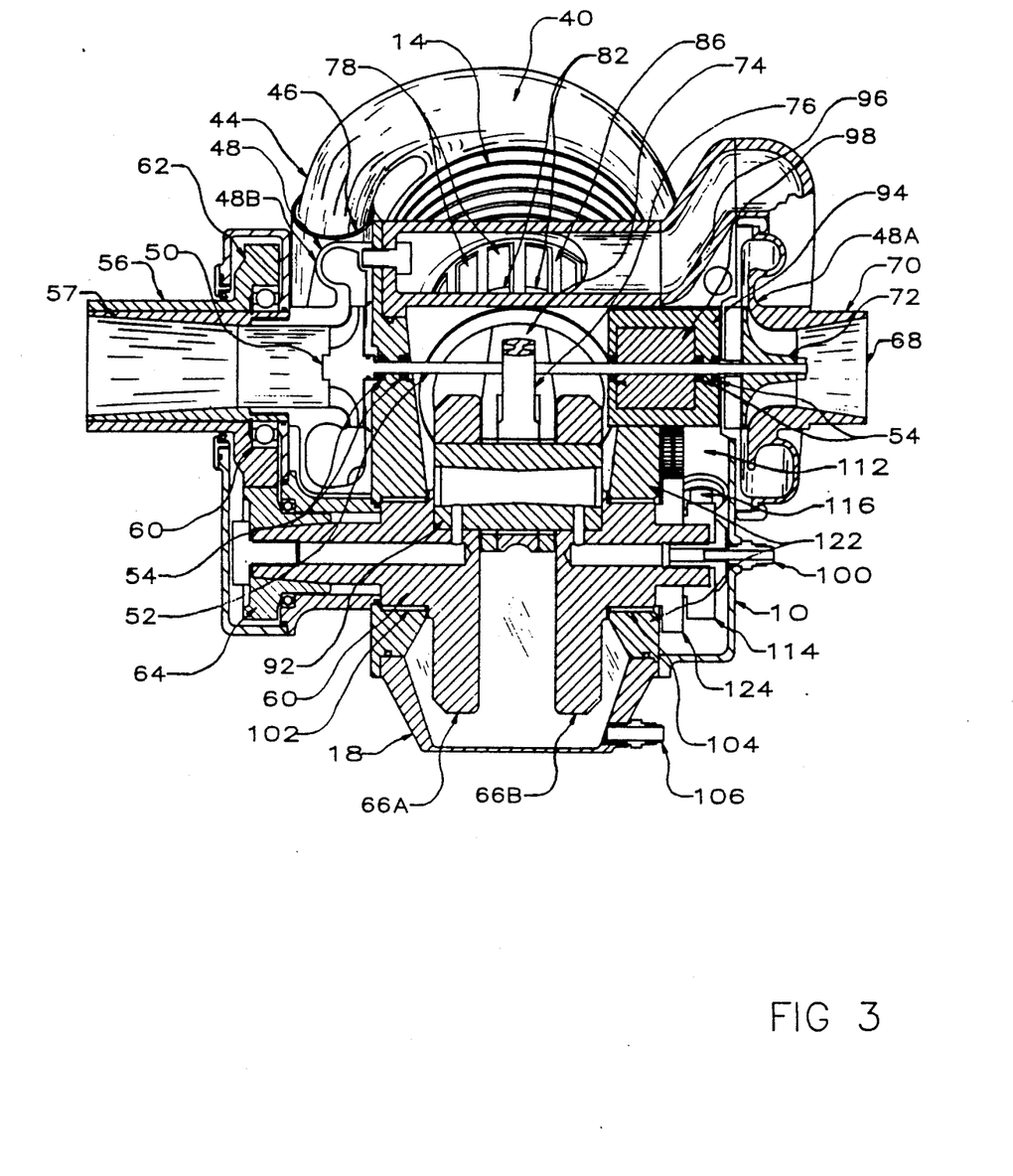
FIG. 3 is a side elevational view, thereof with portions broken away.

The output of the engine 10 is taken from hollow output shaft 56 which is journaled within a gear box 58 by bearing 60. As shown in FIG. 3, secured to the turbo housing 48 is an exhaust pipe 57 which extends through the hollow drive shaft 56 to allow exhaust gases to reach the atmosphere. The output shaft 56 includes an integral drive gear 62 which is driven by mating pinion gear 64 on crank shaft 66 as shown in FIG. 3. Typically the gear combination 62–64 produces a speed reduction of 1.85:1. The output shaft 56 is preferably secured to an aircraft propeller (unshown) which is compatible with the horsepower and operating speed of the engine 10. In one embodiment rated at 30 BHP at 6,000 RPM, the engine drives a 36 inch diameter 22 pitch experimental wooden propeller produced by Props, Inc. of Santa Ana, Ca.

TURBOCHARGING

The air inlet 68 for the engine 10 is in line with the output shaft 56 and on the opposite side of the engine 10. The inlet 68 and its housing 70 may be seen in FIGS. 3 and 4. The inlet housing 70 encloses the compressor wheel 72 of turbocharger 48 which provides 10 to 12 psi boost, maximum, with a typical boost of 5 to 8 psi at 75% power. The compressor wheel 72 is mounted on shaft 52. Note that the turbocharger 48 is split and its two turbine blades 50 and 72 located on opposite ends of the engine 10 and sides of the engine cylinders 14 and 16. The turbocharger shaft 52 extends through the crankcase 18 in the space between the connecting rods 74 and 76 in otherwise unused space within the crankcase 18 between the legs of a V formed by the cylinders 14 and 16, as best seen in FIG. 2.

CRANK-ROD-PISTON ASSEMBLY

The connecting rods 74 and 76 carry pistons 78 and 80 which travel in their cylinders 14 and 16 within sleeve valves 82 and 84. The sleeve valves 82 and 84 are driven in elliptical patterns within static cylinder liners 86 and 88 of their respective cylinder. The cylinder liners 86 and 88 each have a lower flange 86A and 88A which rest on lips 14A and 16A of the cylinder 14 or 16 and are held in position by screw engagement with internal threads on their respective cylinder head 20 or 22. The cylinder liners 86 and 88 each have a pair of sets of ports, intake ports 86B and 88B communicating with intake manifold 38 and exhaust ports 86C and 88C communicating with the exhaust manifold 34 of cylinder 14 and its counterpart of cylinder 16.

Figure 1:
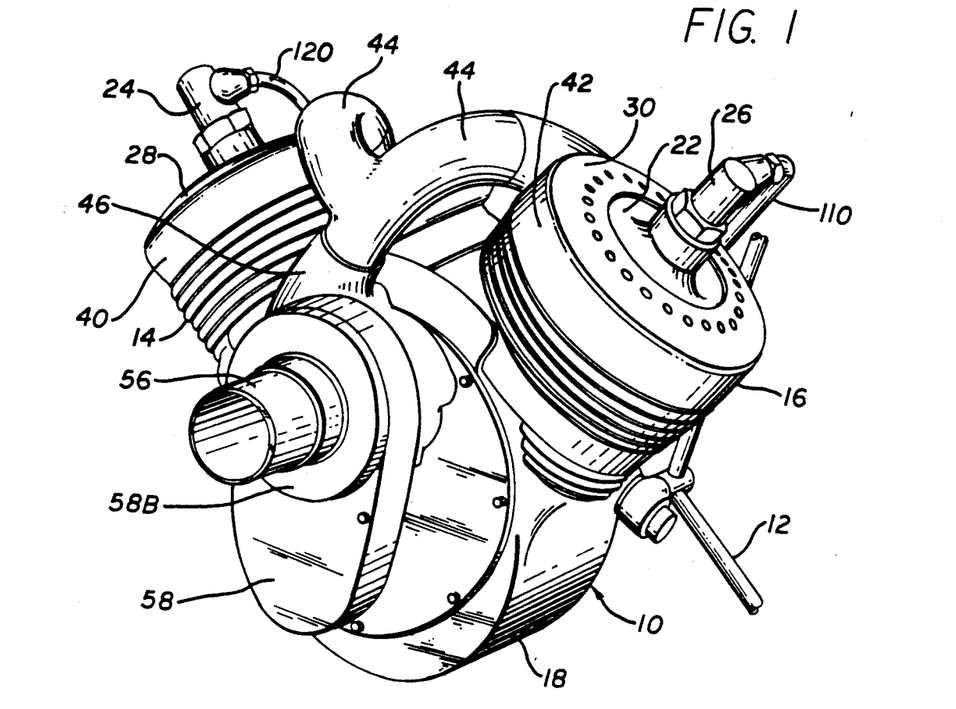
FIG. 1 is a perspective embodiment of one embodiment of this invention.
Figure 2:
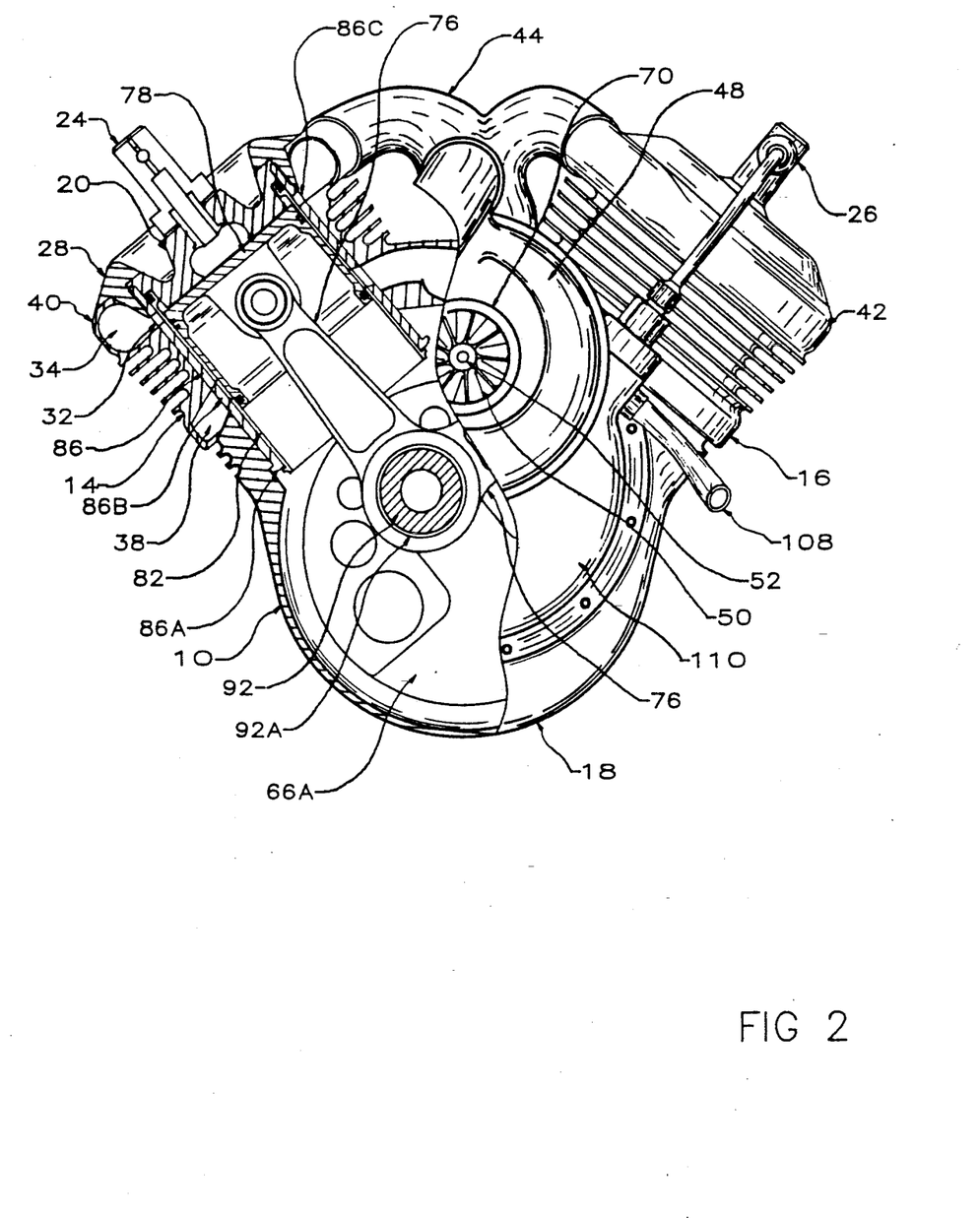
FIG. 2 is a front elevational view of the embodiment of FIG. 1 with portions broken away to show the interior thereof.

The piston 78 is coupled by its wrist pin 79 to connecting rod 76 which, in turn, is journaled by crank pin 92 on the crankshaft 66 with its counter weights 66A and B of FIG. 3, only one of which, 66A, appears in FIG. 2. Connecting rod 76 is of the blade type and 74 is of forked configuration at its lower end to allow side by side location of the cylinders 14 and 16. Both connecting rods 74 and 76 use the common crank pin 92.

PORTING AND SLEEVE VALVES

Figure 6:
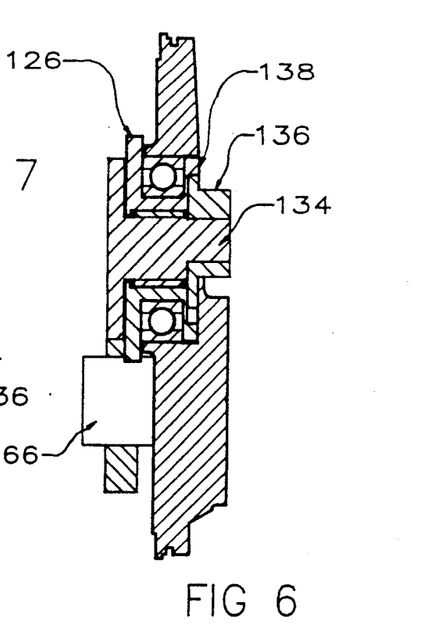
FIG. 6 is a side elevational view thereof, partly in section.
Figure 7:
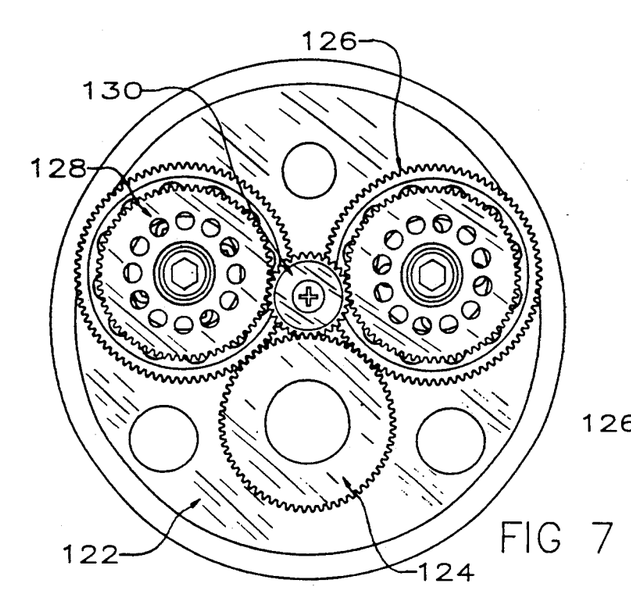
FIG. 7 is a rear elevational view thereof.
Figure 8:
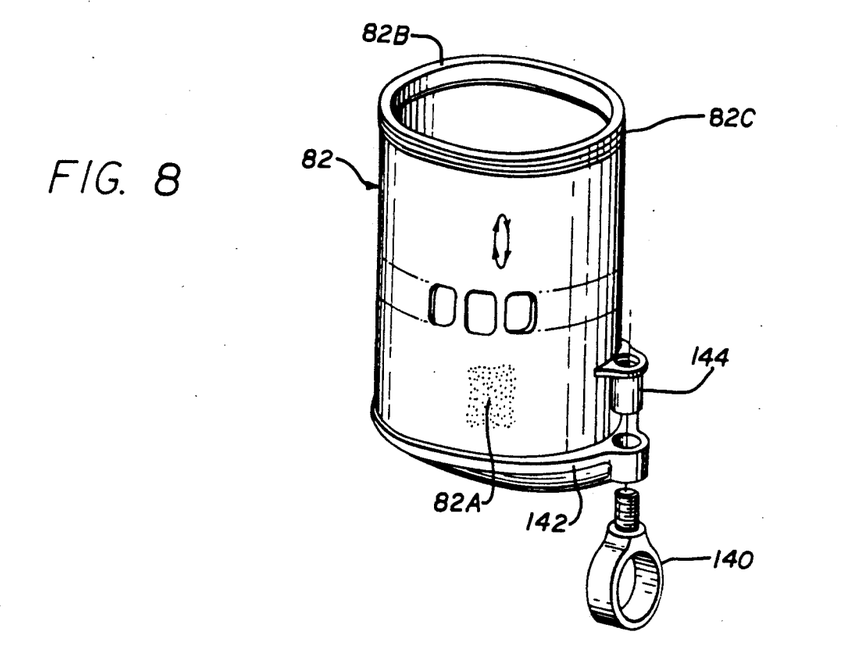
FIG. 8 is a perspective view of a slide valve of this invention.

The porting of the cylinders described above allows uniflow travel of the combustion gases with intake from the compressor stage through the intake ports at the bottom of the piston stroke when the intake ports in the sleeve valves 82 and 84 open and exhaust occurs throughout the total periphery of the cylinder when the sleeve valves 82 and 84 move downward as controlled by the counter rotating dual eccentric drive of FIGS. 6–8. The sleeve valves 82 and 84 are of composite material comprising a base of cast iron, with a flame or plasma sprayed silicon bronze coating 82A and 84B in the order of 0.020 inch in depth. The silicon bronze coating is porous and holds lubricating oil, so, to an extent, is self lubricating. The sleeve valves are driven in an elliptical path shown in FIG. 8 by the drive system of FIG. 6–8 to aid in lubrication.

ENGINE LUBRICATION

The engine 10 may be lubricated by a remote lube oil pump, not shown through the lube oil inlet fitting 100 and return fitting 106, both shown in FIG. 3. As an option, an internal oil pump may be used. Oil is delivered from the inlet fitting 100 through the hollow main crank shaft 66 to its main bearings 102 and 104 and to its crank pin 92 by the porting shown in FIG. 3. Lube oil return is through scavenger return fitting 106 in the reservoir 18.

FUEL SUPPLY

Fuel such as JP 4, JP 5 or diesel No. 2, having a cetane rating of at least 38, is recommended for this engine. It is supplied to the fuel intake fitting 108 of FIG. 2. The fitting 108 supplies fuel to a fuel reservoir within the cover 110 for the fuel injector pump 112 appearing in FIGS. 3 and 4. A similar fitting and reservoir, unshown in the drawing, provides fuel to the cylinder 14. An injector pump, such as pump 112 of FIG. 3, for each additional cylinder is located in the cover 110 and positioned to be operated by the lobe 114 of cam 116. The injector pump 112 feeds fuel via line 118 to fuel injector 26. The corresponding pump for cylinder 14 supplies fuel to injector 24 via line 120 of FIG. 1.

ALTERNATOR

Referring now specifically to FIG. 3, an engine driven alternator 94 includes stator 96 and rotor 98 is enclosed within the engine 10 housing. The rotor 98 is mounted to rotate on shaft 52 with the turbocharger turbine wheels 50 and 72. The alternator 94 provides on board electrical power, eg. 1.5 KW at 24 volts.

SLEEVE VALVE OPERATING COMPONENTS

Figure 4:
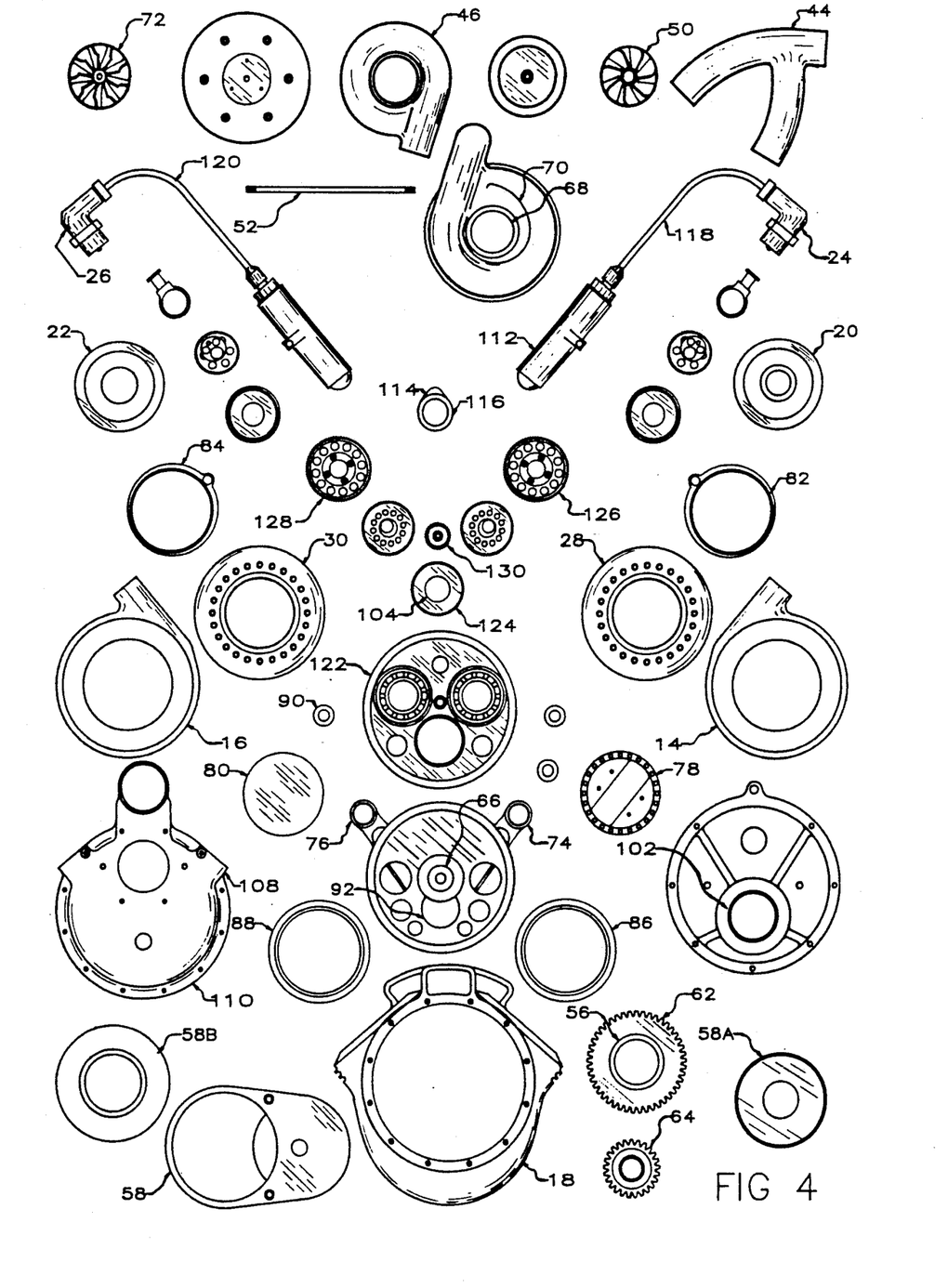
FIG. 4 is an exploded view of the parts of the engine of FIG. 1.
Figure 5:
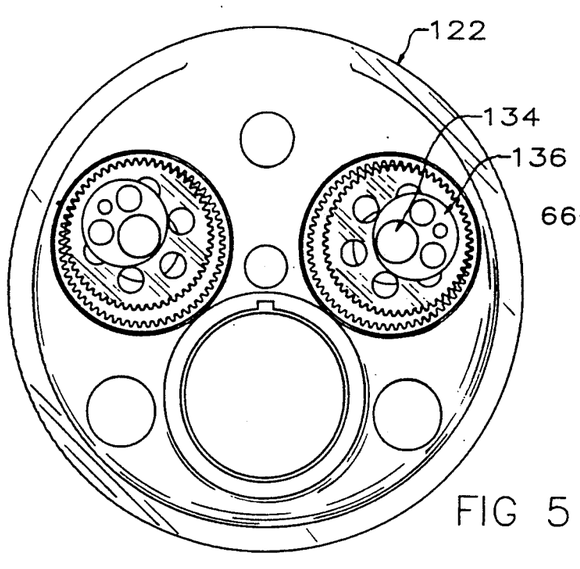
FIG. 5 is a front elevational view of the outer face of the bearing support plate of the engine of FIG. 1.

The sleeve valves 82 and 84 are operated by the system of FIGS. 5 through 8 and shown in parts in FIG. 4 as well as in slight detail in FIG. 3. The basic element which also provides a support for main bearing 104 is bearing support plate 122, located in the engine 10 toward the air inlet or front end of the engine. In addition to supporting main bearing 104 of FIG. 3, it positions primary sleeve drive gear 124, secondary sleeve drive gears 126 and 128 for the sleeves 82 and 84 and mounts idler gear 130, as well. The primary sleeve drive gear 124 is splined to the crank shaft 66 and drives secondary sleeve drive gears 126 and 128 in synchronous counterrotation.

The bearing support plate 122 also journals primary eccentric 134 on its inner face as shown in FIGS. 6 and 7. The primary eccentric 134 drives a secondary eccentric 136 which has external gear teeth engaging an internal ring gear 138. The two eccentrics 136 and 138 define an elliptical path having a minor axis which is 20% of the major axis. The secondary eccentric 136 rides in the opening of sleeve driving yoke 140 of FIG. 8. The yoke 140 is secured to a lip extension 142 of sleeve valve 82 by threaded yoke retainer 144. The net result is that with each revolution of the crankshaft 66, the sleeve valves as represented by valve 82 travels the elliptical path shown in FIG. 8. The silicon bronze porous coating on the sleeve valves provides an excellent long life surface when properly lubricated. The porous nature of the silicon bronze provides a reservoir of lubricant in the event of temporary lube oil pressure loss.

FIG. 8 also illustrates clearly the enlarged head 82 B which defines a sealing ring groove 82 C for holding a sealing ring (unshown). The addition of at least one sealing ring to the upper end of a sleeve valve makes it truly practical and useful, particularly in two cycle engines. Expanding gases in the expansion or power stroke applies pressure to the upper surface of the expanded head of the sleeve valve in its intended direction of movement.

SUMMARY AND CONCLUSION

The foregoing concepts are believed to make the compression ignition engine truly useful for applications wherein the past, its weight ruled out its use. This is particularly true in aircraft installations. Its use in pusher aircraft is particularly important. It is turbocharged via a simple and lightweight arrangement. Of particular importance is that the exhaust is discharged through the center of the output shaft for minimum airflow interference in pusher aircraft installations, even adding the exhaust energy as thrust.

The principles of this invention may also be applied to four cycle and spark ignition engines.

The foregoing embodiment is merely illustrative of the principles of this invention and is not to be considered as limiting. Rather, this invention is defined by the following claims or definitions including the protection offered by the Doctrine of Equivalents.

What is claimed is:

1. An internal combustion engine for driving a shaft constituting the power output of the engine and defining an axis of the engine comprising:
    a plurality of cylinders positioned at radial locations with respect to the axis of the engine defined by said power output shaft;
    said output shaft being hollow including an axial opening communication with the exterior of said engine; and
    an exhaust manifold communicating between said cylinders and said the axial opening of said output shaft whereby the engine exhaust is discharged through the axial opening said output shaft.

2. An internal combustion engine in accordance with claim 1 wherein said engine is designed for pusher aircraft applications and a propeller to the is secured to said output shaft whereby the engine exhaust is discharged into the center of the propeller downstream air.

3. An internal combustion engine in accordance with claim 1 wherein said engine includes a turbocharger and said turbocharger includes a drive turbine located in the exhaust gas stream between the exhaust manifold and the axial opening of said hollow output shaft.

4. An internal combustion engine in accordance with claim 1 wherein said cylinders number at least two defining a generally V shaped region between adjacent cylinders with said hollow output shaft located in the region of the V between adjacent cylinders;
    a common crank shaft for said cylinders and driving means coupling said crank shaft to said output shaft.

5. An internal combustion engine in accordance with claim 3 wherein said turbocharged engine includes an intake air turbine coupled to said drive turbine and located on the opposite side of said cylinders from said drive turbine.

6. An internal combustion engine in accordance with claim 5 including a crank case assembly for said engine including means for rotatably mounting said intake air compressor and said drive turbine.

7. An internal combustion engine in accordance with claim 6 including a crankshaft wherein said rotatable mounting means for said turbine and said compressor comprise a common shaft journaled in the region between said cylinders and displaced from said crankshaft.

8. An internal combustion engine in accordance with claim 4 including speed change means coupling said crankshaft to said output shaft.

9. An internal combustion engine in accordance with claim 8 wherein said speed change means comprises reduction gears.

10. An internal combustion engine in accordance with claim 7 including an inlet air compressor housing secured to said crankcase in the region between adjacent cylinders of said engine and on one side of said cylinders and a drive turbine housing secured to said crankcase in the region between adjacent cylinders on the opposite side of said cylinders and communicating between an exhaust manifold of said cylinders and the hollow output shaft of said engine.

11. A turbocharged internal combustion engine comprising at least a pair of cylinders arranged in a generally V shape with a crankshaft operating in the general area of the apex of the V;
    an air inlet at one side of said cylinders generally between the legs of the V;
    an exhaust outlet from said engine at the opposite side of said cylinders generally between the legs of the V; and
    a turbocharger for said engine located generally between the legs of the V with a compressor one side of said cylinders and a drive turbine on the opposite side of said cylinders and a common shaft extending generally between the legs of the V.

12. A turbocharged internal combustion engine in accordance with claim 11 wherein said drive turbine is located in the exhaust gas path of said engine.

13. A turbocharged internal combustion engine in accordance with claim 11 wherein said air inlet and exhaust outlet are parallel to the axis of the crank shaft and laterally displaced therefrom in the region between the legs of the V formed by the cylinders.

14. A turbocharged internal combustion engine in accordance with claim 1 wherein the engine includes a hollow power output shaft, and an exhaust pipe within said hollow power output shaft and the engine exhaust is discharged through said exhaust pipe in said hollow power output shaft of the engine.

15. An internal combustion engine for driving a shaft constituting the power output of the shaft and defining an axis of the engine comprising:
- a plurality of cylinders positioned at different radial locations with respect to the axis of the engine defined by said power output shaft;
- said output shaft being hollow;
- an exhaust pipe within said hollow output shaft; and
- an exhaust manifold communicating between said cylinders and said exhaust pipe an exhaust manifold communicating between said cylinders and said hollow output shaft whereby the engine exhaust is discharged through said output shaft;
- intake manifold communicating with said cylinders;
- a sleeve valve within each cylinder for opening and closing communication between respective input manifold and exhaust manifold with said cylinder wherein each sleeve valve includes an enlarged head region in the compression end of its cylinder;
- said enlarged head defining a sealing ring retaining recess and presenting a surface to expanding gases to provide a valve opening force during the power stroke of the cylinder; and
- a sealing ring in said sealing ring retaining recess.

16. An internal combustion engine for driving a shaft constituting the power output of the engine and defining an axis of the engine comprising:
- a plurality of cylinders positioned at radial locations with respect to the axis of the engine defined by said power output shaft;
- said output shaft being hollow;
- an exhaust pipe within said hollow output shaft; and
- an exhaust manifold communicating between said cylinders and said exhaust pipe whereby the engine exhaust is discharged through the output shaft;
- an intake manifold;
- sleeve valves within each cylinder for opening and closing communication between each cylinder and the intake and exhaust manifolds;
- each cylinder including a cylinder body having an interior surface defining the cylinder walls adjacent to respective sleeve valves and an exterior wall portion including cooling means;
- means for securing the cylinder assembly to the engine and including an outer threaded opening for receiving a cylinder head and retaining means therefor;
- a cylinder head including an injector port; and
- threaded cylinder head retainer means including an injector port and threaded exterior surface for engaging the threaded opening in said cylinder body to secure the cylinder head in position on said engine.

17. An internal combustion engine in accordance with claim 16 wherein said sleeve valves include enlarged head region in the compression engine of its respective cylinder;
- said enlarged head defining a sealing ring retaining recess and presenting a surface to expanding gases to provide a valve opening force during the power stroke of the cylinder; and
- a sealing ring in said sealing ring retaining recess.

18. An internal combustion engine in accordance with claim 17 wherein the cylinder heads of the engine each includes a recess for receiving enlarged head wall thickness portion of said sleeve valve above the maximum compression stroke travel of the piston of the engine.

* * * * *

UNITED STATES PATENT AND TRADEMARK OFFICE
CERTIFICATE OF CORRECTION

PATENT NO. : 5,088,285
DATED : 02/18/92
INVENTOR(S) : Gregory S. Stevenson

It is certified that error appears in the above-identified patent and that said Letters Patent is hereby corrected as shown below:

Column 6, line 10, after "propeller" delete [to the];

line 12, after "propeller" insert --to the--.

Signed and Sealed this

Eighth Day of June, 1993

Attest:

MICHAEL K. KIRK

Attesting Officer     Acting Commissioner of Patents and Trademarks